United States Patent Office 3,167,838
Patented Feb. 2, 1965

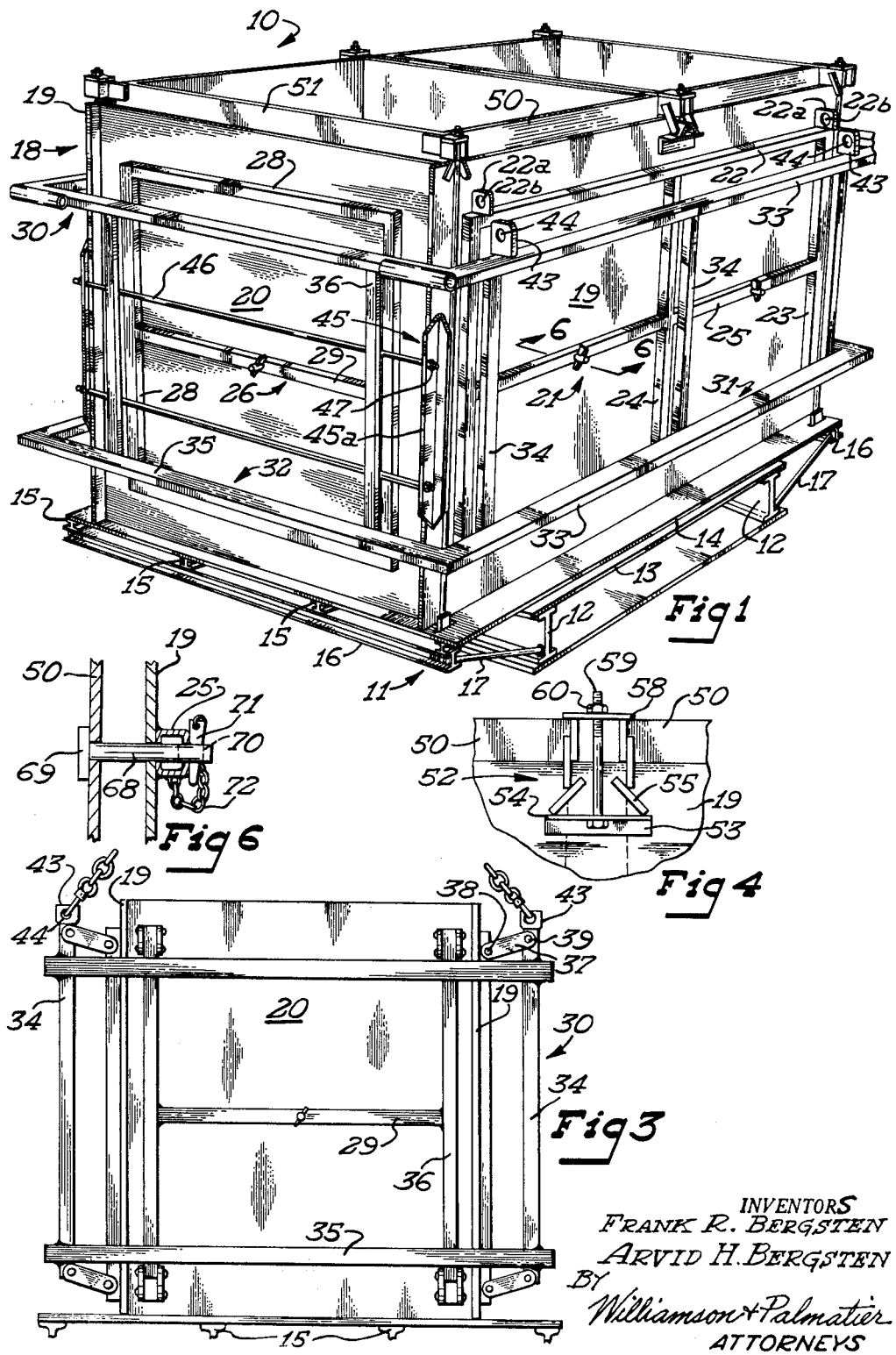

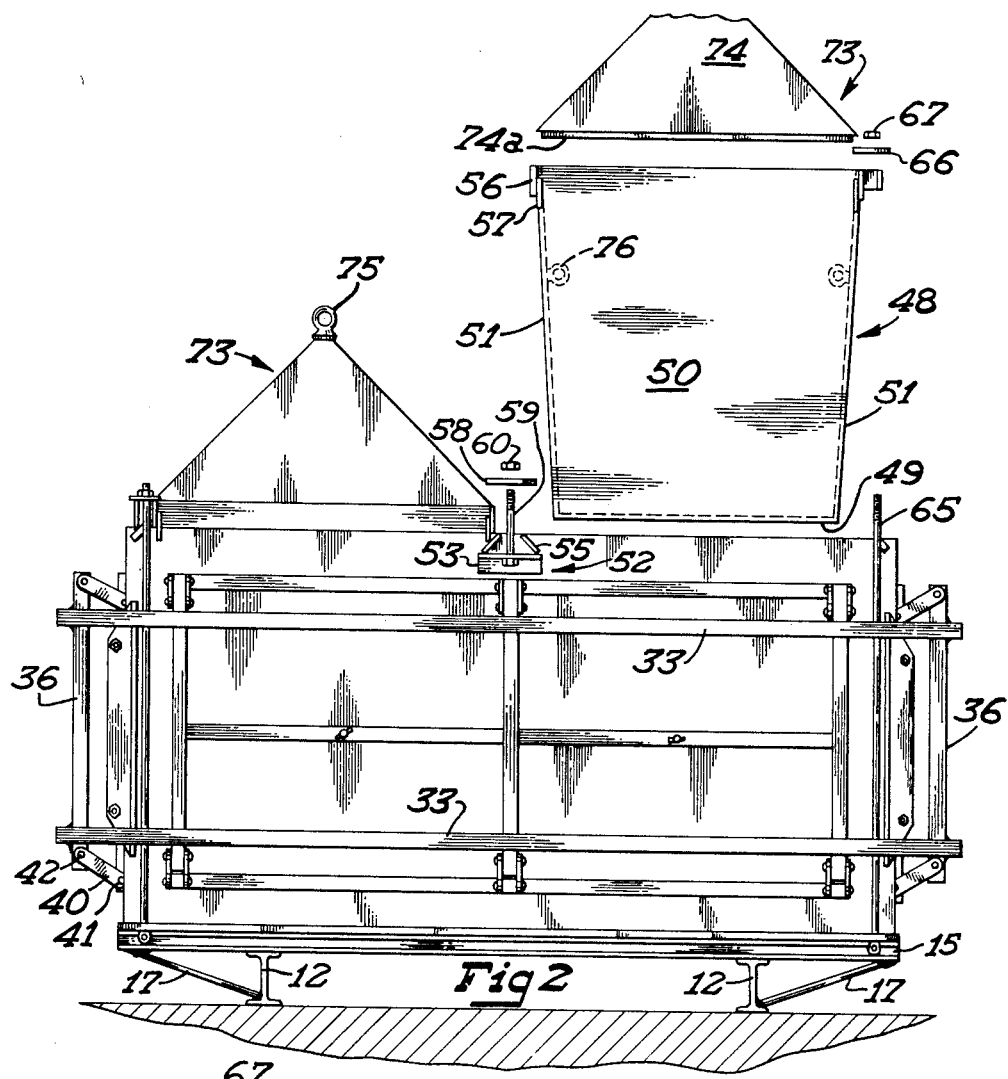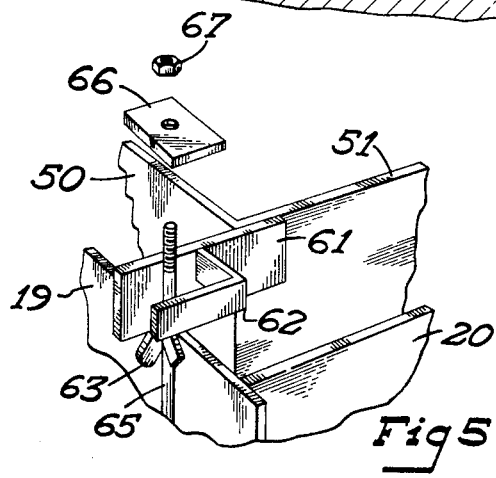

3,167,838
APPARATUS FOR MOLDING SEPTIC TANKS
Frank Robert Bergsten, 427 Western, and Arvid H.
Bergsten, 759 W. Main, both of Anoka, Minn.
Filed Oct. 11, 1961, Ser. No. 147,400
3 Claims. (Cl. 25—130)

This invention relates to apparatus for molding receptacles from cementitious material and more particularly to apparatus for molding septic tanks from cementitious material.

One of the long existing problems associated with sewerage disposal systems of the type incorporating septic tanks has been the difficulty in producing a septic tank which will provide an effective septic action for an extended period of time. Septic tanks, among other things, must be sealed from the exterior except for the inlet and outlet conduits thereof as pointed out in my co-pending application, Serial Number 36,414, now Patent No. 3,109,-813. Most conventional septic tanks formed from cementitious material such as concrete, are molded in sections since the conventional molds for the tanks do not permit molding of an integral septic tank. These sections must thereafter be assembled and this assembly operation is not only time consuming but the juncture line between joined sections often fail and therefore render the tank pervious to the flow of liquids therethrough. When this occurs, the septic action within the tanks will be diminished, and the tanks will become quickly clogged. Further, the steps of setting up of the molds and the removal of the molded sections therefrom, even in the procedure involving molding sections only is a long and tedious operation. Thus, the labor cost of producing such conventional tanks is quite high. The instant invention is directed towards overcoming these problems.

It is, therefore, the general object of our invention to provide a novel apparatus, of simple and inexpensive construction and operation, for molding an integral receptacle such as a septic tank from cementitious material.

Another object of this invention is to provide a novel and improved apparatus for molding septic tanks of integral construction from cementitious material, and in which septic tanks formed through the use of our apparatus effects a great saving of time and labor.

A further object of this invention is to provide a novel and improved apparatus for molding an integral septic tank from cementitious material, and including cooperating male and female mold structures arranged and constructed for quick removal thereof from the form tank.

Another object of this invention is to provide a novel and improved apparatus for quickly and efficiently molding compartmented septic tanks of integral construction from cementitious material, said apparatus including a female mold member arranged and constructed to be quickly shifted from an inoperative position to an operative position for accurately receiving and positioning a pair of male mold structures therein in side-by-side relation.

A further object of our invention is to provide a novel and improved apparatus for molding septic tanks of integral construction from cementitious material, these septic tanks formed through the use of our apparatus being of more durable, efficient construction than any heretofore formed septic tanks molded from comparable structures.

These and other objects and advantages of this invention will more fully appear from the following description made in connection with the accompanying drawings, wherein like reference characters refer to the same or similar parts throughout the several views, and in which:

FIG. 1 is a perspective view of our invention;

FIG. 2 is a side elevational view of our invention with one of the male mold structures illustrated in an elevated position;

FIG. 3 is an end elevational view of our invention with certain parts thereof indicated in a different position by dotted line configuration;

FIG. 4 is a fragmentary detailed view on an enlarged scale of the intermediate positioning element;

FIG. 5 is an exploded perspective view on an enlarged scale of the end positioning element; and FIG. 6 is a cross sectional view on an enlarged scale taken approximately along line 6—6 of FIG. 1 and looking in the direction of the arrows.

Referring now to the drawings and more specifically to FIG. 1, it will be seen that our molding apparatus designated in its entirely by the reference numeral 10 includes a base 11. Base 11 is provided with a pair of I-beams or rails 12 fixedly connected to a reinforcing plate 13, the latter being connected to the upper flanges of the I-beams 12 as by welding or the like while the lower flanges of the I-beams are adapted to be positioned upon a supporting surface such as the ground or the like. A substantially rectangular flat supporting plate 14 is positioned upon the reinforcing plate 13 and is fixedly connected thereto as by welding and this supporting plate 14, as best seen in FIG. 1, is substantially longer than the reinforcing plate 13. These plates 13 and 14 are constructed of strong metallic material such as steel or the like and the overhanging portions of the supporting plate 14 are provided with a plurality of longitudinally extending small-end beams 15 at both ends thereof. These small beams 15 are also of I-shape cross-sectional configuration, the lowermost flanges of these beams being fixedly connected to a transversely extending beam 16. Diagonally extending reinforcing end plates 17 extend from the lowermost flanges of the I-beams 12 and are fixedly connected at their uppermost end to the transversely extending beam 16 so that the end portions of the supporting plates 14 are suitably reinforced to withstand the upward thrust of other elements of our molding apparatus during the molding operation which is to be described hereinbelow.

Our molding apparatus 10 also includes a female mold structure 18 which is of substantially elongate rectangular shape and is comprised of opposed side plates 19 and opposed end plates 20. It will be noted that the side and end plates 19 and 20 respectively are rectangular shaped configuration and are disposed in upstanding relation upon the supporting plate 14. These plates are also constructed of strong rigid metallic material such as steel or the like. Actually, the plates are separable from each other and are movable between operative closed and inoperative open positions. Referring again to FIG. 1 it will be seen that the side plates 19 are each provided with a reinforcing frame structure 21 comprised of vertically spaced horizontally extending upper and lower frame elements 22 interconnected at their ends by vertically extending end elements 23. The reinforcing or stiffening frame structure 21 also includes an intermediate vertically extending frame element 24 and an intermediate horizontally extending frame element 25 so that each of the side plates 19 is suitably reinforced and stiffened to prevent bending, distortion or breaking of the plates.

The end plates 20 are also provided with reinforcing or stiffening frame structures, designated by the reference numeral 26, each including vertically spaced, horizontally extending upper and lower frame elements 27 interconnected at their respective ends by vertically extending frame elements 28. A horizontally disposed intermediate frame element 29 interconnects each of the vertical end frame elements 28 intermediate their respective ends. Thus, it will be seen that the end plates 20 are suitably stiffened and reinforced in a manner similar to the side plates 19.

Each of the side plates 19 and each of the end plates 20 are shiftable with respect to each other, as pointed out above, from an operative closed position to an inoperative open position. Means are provided for causing shifting movement of each of the side and end plates of the female mold structure 18 and this means includes a rigid frame structure 30 which is interconnected with the female mold structure for vertical shifting movement relative thereto. This rigid frame structure 30 is of continuous construction and extends around and is positioned outwardly of the female mold structure 18. Actually, as best seen in FIGS. 1 and 3, the rigid frame structure 30 is of substantially rectangular shape and includes opposed side frame members 31 connected at their respective ends by the end frame members 32 to thereby define a continuous structure. It will be noted that each of the side frame members 31 is disposed closely adjacent but spaced from one of the side plates 19 while the end frame members 32 are disposed closely adjacent but spaced from the end plates 20.

The side frame members 31 are each composed of vertically spaced horizontally extending frame elements 33 interconnected by a plurality of laterally spaced vertically extending frame elements 34. These frame elements 33 and 34 are rigidly interconnected with each other as by welding to provide a substantially rigid upright structure. The end frame members 32 are each comprised of a pair of vertically spaced horizontally extending frame elements 35, rigidly interconnected by spaced apart vertically extending frame elements 36. It will also be noted that the uppermost of the horizontally disposed frame elements 33 are rigidly interconnected and continuous with the uppermost of the horizontal frame elements 35, while the lowermost of the horizontally extending frame elements 33 are rigidly connected with and continuous with the horizontally extending frame elements 35.

Referring now to FIG. 3, it will be seen that the vertically extending frame elements 34 of the side frame members 31 are interconnected with the vertically extending end frame elements of the reinforcing frame 26 by means of links 37.

These small elongate links 37, as best seen in FIG. 3 are each pivotally connected at the outermost end 39 to the vertically extending elements 34 of the frame members 31 and are pivotally connected at their inner ends as at 38 to the vertically extending frame elements 23. Actually, one of these links 37 extends between its associated frame member 31 and reinforcing frames 21 adjacent the respective corners of the side plates 19. This arrangement defines a parallelogram linkage, as best seen in FIG. 3, whereby upon vertical movement of the rigid frame structure 30, the side plates are simultaneously caused to be shifted outwardly as indicated by dotted line in FIG. 8.

Referring now to FIG. 2, it will be seen that a plurality of links 40 interconnect each of the end frame members 32 with the re-inforcing frame 26 of the end plates 20 and these end links extend between the frame members 32 and 26 respectively adjacent the corners of the end plates 20. Each of the links 40 is pivotally connected to one of the vertically extending frame elements 28, as at 41, and is also pivotally connected at 42 to one of the frame elements 36 of the frame structure 30. It will be seen that the frame member 32 of the frame structure 30 and the plate 20 are interconnected by the links 40 to define a parallelogram linkage in the manner of the side plates 19 and frame structure 31. Again, it will be seen that upon vertical movement of the frame structure 32, the end plates associated therewith will be caused to simultaneously shift outwardly.

Means are provided for attaching a hoisting cable or chain to the plates 19 and include a pair of spaced apart attachment brackets 22a, each pair being attached to one of the horizontal extending frame elements 22 adjacent the ends thereof and each of these bracket elements 22a is provided with a centrally located aperture 22b which permits ready attachment of a chain or the like thereto. The rigid frame structure 30 is also provided with means for attaching a hook or the like thereto and this means includes a plurality of brackets 43 each being rigidly connected to the uppermost of the horizontally extending frame elements 33 adjacent the ends thereof and each of these brackets 43 is provided with an aperture 44 formed therein to facilitate the connection of a hook of a hoisting chain thereto, as best seen in FIG. 3.

When the plates 19 and 20 are in the operative closed position, the opposed edge portions of each plate is disposed in engagement with adjacent upstanding edge portions of adjacent plates as best seen in FIG. 1. Means for maintaining the side plates 19 in engagement with end plates 20 are provided so that accidental separation of the plate is prevented. This means includes a pair of angle brackets 45 each connected to opposite ends of the side plates 19 and each of the side plates including a flange 45a extending longitudinally beyond the edge of the side plates. Each of these flanges 45a is provided with a pair of vertically spaced apertures through which extend horizontally extending rods 46 which are threaded at one end and which have an enlarged head at the other end, these rods are secured in place by means of a nut 47 which may be tightened to suitably bias the side plates into engagement with the end plates to permit accidental disengagement of these plates.

Our novel mold apparatus 10 also includes a male structure which, as best seen in FIG. 2, is of substantially rectangular shape and is in the form of an open top container. This male mold structure 48 is preferably formed of metallic material and includes a bottom wall 49 rigidly interconnected with laterally spaced side walls 50 and longitudinally spaced side walls 51. Opposite edges of the walls 50 and 51 respectively are interconnected along their entire vertical extent so that the male mold structure 48 is of unitary construction. Actually, it will be seen that the opposed walls 50 and 51 converge downwardly slightly which tapered construction facilitates removal of the male mold member from the molded structure upon setting of the concrete. It will also be noted from reference to FIGS. 1 and 2 that our mold apparatus permits molding of the compartmented septic tank so that a pair of male mold structures 48 are provided. These mold structures will be positioned within the female mold structure in side-by-side relation and supported by the latter during the molding operation.

Means are provided for properly positioning each of the male mold structures 48 within the female mold structure 18 and this means includes an angle bracket 52 fixedly connected to each of the side plates 19 adjacent the upper peripheral edge thereof but centrally located with respect to the ends of the side plates. Each of these angle brackets 52 includes a vertically extending flange 53 which is fixedly connected to the exterior surface of its associated side plate 19 and each of the angle brackets 52 also includes a horizontally extending flange 54 which projects outwardly from its associated side plate. Referring now to FIG. 4, it will be seen that a pair of downwardly diverging, substantially flat cam members 55 are secured to each of the side plates 19 and project outwardly from the side thereof.

This positioning mechanism also includes a pair of bracket plates 56 each welded to the innermost upper corners of the male mold structure 48. Actually, each of these plates 56 is connected to the innermost of the walls 51 and projects outwardly therefrom adjacent opposite end portions thereof. Each of these plate brackets 56 is provided with an outwardly and downwardly extending cam element 57 as best seen in FIG. 1, and these cam elements will engage the upper peripheral edges of side plates 19 and will also engage the cam elements 55 when the male mold structures are positioned within the female structures. When this happens the lower edges of the cam elements 57 center the male mold structures 48 with respect to the side plates 19 and the endmost portions of the cam elements 57 engage the cam 55 to urge each of the male mold structures 48 towards its associated end plate 20.

Referring again to FIG. 4, it will be seen that when the male mold structures 48 are disposed within the female mold structure 18, a small plate 58 will be disposed upon the upper edges adjacent the plate brackets 56 and this small plate 58 is apertured to receive the upper end of a bolt 59 which extends through a suitable aperture formed in the flange 54 of angle bracket 52 and this bolt 59 is secured in place by means of a nut 60.

Cooperating positioning means are also positioned at the corners of the male mold structures 48 and the female mold structure 18, as best seen in FIGS. 1 and 5. Referring now to FIG. 5, it will be seen that the outermost end wall 51 of each of the male mold structures 48 are provided with a pair of laterally extending plate brackets 61 extending outwardly from adjacent each upper corner thereof and each of these plate brackets 61 is provided with an L-shaped angle element 62 fixedly connected thereto as by welding. Each of these plate brackets 61 is also provided with a downwardly and outwardly extending camming element 63, the lower edge of which is adapted to engage the upper peripheral edge of its associated side plate 19 so that the male mold structure is urged outwardly towards both sides and thereby centered with respect to the side plates 19 of the female mold structure 48. Each of the side plates 19 is provided with a pair of camming elements 64 positioned adjacent the upper corners thereof and each is adapted to cooperatively engage its associated plate bracket 61 for urging the male mold structure inwardly to thereby cooperate with the camming elements 55 and 57 for centering the male mold structures longitudinally of the female mold structure and to also space the male mold structures 48 the proper distance apart.

It has been found that although each of the male mold mold structures 48 is comprised of metallic material and is, therefore, of relatively heavy construction, these male mold structures are actually buoyed up when the cementitious material is caused to flow into the spaces between the male mold structures and the female mold structures so that tie down or retaining means are necessary for retaining the male mold structures in their properly seated position with respect to the female mold structures. As pointed out above, the innermost ends of the male mold structures are retained against upward movement by means of the bolts 59 which are cooperatively engaged and retained in place by the plate and nut assembly 58 and 60 respectively. The tie down means for the remaining corners of the male mold structure includes a pair of elongate tie down or retaining rods 65 each extending upwardly adjacent each of the corners of the base supporting plate 14, as best seen in FIGS. 1 and 5. The base plate 14 is provided with an aperture adjacent each of its corners and these retaining rods 65 are provided with enlarged heads so that when disposed in upwardly extending relation with respect to the supporting plate 14 each of these rods is retained in place and prevented from upper longitudinal movement by the enlarged head engaging the underside of the plate. Each of these retaining rods extends through small preferably rectangular metallic plate 66 suitably apertured to receive its associated retaining rod therethrough and this plate is adapted to be seated upon the upper peripheral edges of its associated plate bracket and angle elements 61 and 62 respectively. A lock nut 67 engages the upper threaded end of each of the tie down rods 65 to urge the plate 66 into engagement with plate bracket 61 and angle element 62. Thus, it will be seen that the male mold structures will be retained in their properly seated position with respect to the female mold structure and will be retained in upward movement during the pouring of the concrete.

It has also been found that in order to provide the proper spacing between the intermediate portions of the walls 50 and 51 of each of the male mold members 48 and their respective associated median portions of the side and end plates 19 and 20 of the female mold structure 18, a plurality of spacing pins 68 are provided. Referring to FIG. 1, it will be seen that the intermediate horizontal frame elements 25 of the side plate reinforcing frame structure 21 and the horizontal frame element 29 of each end frame reinforcing structure 26 are suitably apertured to receive a pin 68 therethrough while the outermost end walls 51 of each of the male mold structures are also suitably apertured as is each of the end plates 20. These apertures are disposed in registering relation when the female mold structures are in the closed operative position and when the male mold structures are positioned in place and centered with respect to the female mold structure. The side wall 50 and the side plates 19 are also suitably apertured with the apertures arranged in registering relation with the apertures formed in the intermediate frame element 25 of the reinforcing frame 21. The retaining pin 68 will be extended through these apertures and each of these retaining pins 68 is provided with an enlarged head 69 which will engage the innermost surface of the walls 50 and 51 of each of the male mold structures 48. The other terminal end portion of the spacing pins 68 is provided with a wedge-shaped aperture 70, as best seen in FIG. 6, for seating a wedge-shaped retaining pin 71 which will be driven therethrough and these retaining pins 71 are suitably secured to their associated side and end plates 19 and 20 respectively by means of a flexible chain 72.

During the molding operation, the concrete is poured from above into the spaces between the male and female mold structures and in order to facilitate pouring of concrete into the spaces between we have provided a pyramidal shaped cover member 73 for each of the male mold structures 48. Referring now to FIG. 2, it will be seen that each of the pyramidal shaped covers 73 is comprised of a four sided structure each having triangular shaped side 74 rigidly interconnected together and each of the sides 74 is provided with a flange 74a adapted to be positioned within its associated male mold structure 48 for seating the cover 73 thereupon. The apex of each of the pyramidal shaped covers 73 is provided with an eye 75 which permits positioning and removing of the cover from its associated male structure. Referring now to the elevated male mold structure 48, as clearly illustrated in FIG. 2, it will be seen that each male mold structure is provided with a plurality of attachment eyes 76 positioned at each of the inner corners thereof. These eyes are adapted to be connected to a hoisting chain coupling device to permit upward movement of the male mold structures with respect to the female mold structures.

In operation, the female mold structure 18 will be positioned upon the supporting plate 14 and the rigid frame structure 30 which is supported by the female mold structure will be moved downwardly in its seated relation thereby causing the female mold structure to be disposed in its closed operative position. When so positioned, the side and end plates 19 and 20 respectively of the female mold structure 18 will be caused to engage the respective edge portions of each other to thereby define a substantially rectangular closed structure. The male mold structures are then positioned within the female mold structure and these male mold structures will be automatically centered with respect to each other and with respect to the female mold structure by means of the cooperating positioning camming elements 50–57 and 61–64. The tie down bolts 59 are then secured in place and the tie down bolts or rods 65 are suitably positioned in place. The laterally retaining rods 46 which urge the side plates 19 into engagement with the end plates 20 are then positioned in their retaining relationship to prevent outward bulging of the side plates 19 since the total pressure exerted against these side plates will be greater than the pressure exerted against the end plates because of their greater surface area. The spacing pins 68 are then passed through their apertures and retained in place by their associated retaining pin 71 and the covers 73 are then positioned in place upon the male mold structures 48. The mold apparatus is then in condition to be filled with suitable cementitious material which may be caused to flow upon the cover 73 and thereafter into the spaces defined between the male and female mold structures. This concrete may be suitably agitated to prevent the formation of air bubbles therein, and after the mold apparatus is filled suitable reinforcing rods may be inserted in diagonal relationship within the respective walls of the septic tank structure. The concrete will then be allowed to set and after becoming rigid, the covers 73 may then be removed by a suitable hoisting mechanism.

Each of the male mold structures is then provided with a suitable coupling means which interconnects each of the eyes 76 disposed in the corners of each of the male structures. Each of these male structures is then moved up or elevated slightly to suitably disengage it from the interior of the compartments of the concrete septic tank defined by the male structure. This requires only a slight movement of the male structure. At this point, each of the male mold structures will be merely disengaged from its tightly wedged relation with respect to the molded structure and will not be completely removed from the concrete septic tank. In this connection, it should be pointed out that a special coupling means will be used for engaging the male mold structure and will be in the form of a coupling having four chains extending therefrom. After causing the male mold structures to be disengaged from their tightly wedged relation with the interior of the septic tank, a different coupling means provided with suitable depending chains is then connected to the four brackets 43 carried by the rigid frame structure 30 and upon lifting of the hoisting mechanism both the male mold structures 48 will be lifted simultaneously along with the rigid frame structure 30. Upon elevation of the rigid frame structure, the links 37 and 40 will cause outward movement of the side and end plates 19 and 20 respectively, thus causing disengagement of the side plates and end plates from the outer surface of the molded septic tank structures. Both the male and female mold structures may then be removed from the molded septic tank construction to permit the septic tank to be removed from the supporting plate 14. It should be pointed out that the retaining pins 68 and the tie down rods 65 along with bolts 59 will be removed prior to the initial movement of each of the male mold structures 48.

In order to prepare for the next molding operation, it is merely necessary to position the assembled female mold structure upon the space plate 14 and the male mold structures in place within their associated female mold structure. The plates of the female mold structure 18 will be automatically moved to the closed operative position by the co-action of the links 37 and 40 and the frame structure 30. With this arrangement, it will be seen that the disassembly involves merely the separation of the male and female mold structures without necessitating disassembly of any great number of parts. This effects a great saving in time and labor.

It will, therefore, be seen from the above description that we have provided a novel apparatus for readily and effectively molding a receptacle such as a septic tank of cementitious material, the molding operation of a septic tank through the use of our novel apparatus permitting a great saving in both labor and time.

It will also be seen from the preceding paragraphs that our novel molding apparatus includes male and female mold structures arranged and constructed to permit molding of an integral compartmented septic tank structure of cementitious material.

It will also be seen that our novel molding apparatus includes male and female molding structures each having cooperating positioning means thereon to facilitate and insure complete and automatic centering of the male molding structures within the female mold structures which facilitates preparation of the molding apparatus for a molding operation and which also facilitates removal of the mold apparatus from the septic tank structure at the end of the molding operation.

It will, therefore, be seen that we have provided a novel apparatus for molding septic tanks from cementitious material in a more efficient manner than any heretofore known comparable devices.

It will, of course, be understood that various changes may be made in the form, details, arrangement and proportions of the various parts without departing from the scope of our invention.

What we claim is:

1. Apparatus for molding a generally rectangular shaped compartmented septic tank from cementitious material and wherein the septic tank includes a pair of substantially identical side-by-side compartments and in which the septic tank is comprised of an imperforate bottom wall having upstanding side and end walls integrally formed therewith and having an upstanding intermediate wall integrally formed with the bottom wall and extending between the side walls, said apparatus comprising a substantially flat horizontal imperforate base, a substantially rectangular hollow female mold structure positioned on said base and including a pair of substantially flat, upstanding, spaced-apart side plates and a pair of substantially flat, upstanding, spaced-apart end plates, said plates being simultaneously shiftable between an operative closed position and an inoperative open position, each of said plates having opposite upstanding edge portions disposed in engagement with adjacent edge portions of adjacent plates when said plates are in the operative closed position, and said plates being shiftable outwardly and out of engagement with each other when in the inoperative open position, a rigid substantially rectangular frame structure spaced outwardly of and extending around said female mold structure, a plurality of links pivotally connecting said plates with said rigid frame and cooperating with said frame during vertical movement thereof to cause simultaneous shifting of said plates between said operative and inoperative positions, a pair of substantially identical open topped, generally rectangular shaped hollow male mold structures disposed in side-by-side spaced-apart relation within said female mold structure and each including an imperforate bottom wall and upstanding side walls integrally formed therewith, a plurality of positioning cams fixedly mounted on the upper peripheral portion of certain of said plates of said female mold structure and projecting outwardly therefrom, a plurality of positioning cams fixedly mounted adjacent the upper peripheral portion of the side walls of each of said male mold structures and projecting outwardly therefrom, said last mentioned cam engaging the upper peripheral edge of certain of said plates and also engaging said first mentioned positioning cam to automatically position and suspend each of said male mold structures in predetermined spaced-apart, side-by-side relation within said female mold structures and also positioning each of said male mold structures in predetermined spaced relation from the inner surface of said plates and the upper surface of said base when said plates are in the operative closed position.

and a plurality of elongate retaining rods extending between and being detachably connected with the base and with the upper peripheral edge portion of the side walls of each of said male mold structures exteriorly of the female mold structure and being operative for retaining said male mold structures in their side-by-side predetermined spaced relation within said female mold structures during the molding operation as cementitious material is introduced into the space between the male and female mold structures.

2. The apparatus as defined in claim 1 wherein said positioning cams mounted on said male mold structures each present a downwardly inclined, outwardly projecting camming surface.

3. The apparatus as defined in claim 1 wherein said positioning cams mounted on said plates are mounted on said side plates only, and each side plate having at least a pair of positioning cams mounted intermediate the ends thereof disposed in close proximity to each other and each presenting downwardly diverging camming surfaces to respectively engage by a camming element on each of said male mold structures.

References Cited in the file of this patent
UNITED STATES PATENTS

| | | |
|---|---|---|
| 793,539 | Pittyjohn | June 27, 1905 |
| 973,910 | Biswell | Oct. 25, 1910 |
| 992,652 | Glavin et al. | May 16, 1911 |
| 1,164,106 | Lerch | Dec. 14, 1915 |
| 1,251,650 | Enholm | Jan. 1, 1918 |
| 1,579,634 | Bidwell | Apr. 6, 1926 |
| 2,068,302 | Nickol | Jan. 19, 1937 |
| 2,828,526 | Blasius et al. | Apr. 1, 1958 |